United States Patent
Matsuhashi et al.

(10) Patent No.: US 11,201,356 B2
(45) Date of Patent: Dec. 14, 2021

(54) NONAQUEOUS ELECTROLYTE SECONDARY BATTERY

(71) Applicant: The Furukawa Battery Co., Ltd., Yokohama (JP)

(72) Inventors: Nozomi Matsuhashi, Iwaki (JP); Norihiro Kon, Iwaki (JP)

(73) Assignee: The Furukawa Battery Co., Ltd., Iwaki (JP)

(*) Notice: Subject to any disclaimer, the term of this patent is extended or adjusted under 35 U.S.C. 154(b) by 0 days.

(21) Appl. No.: 17/213,541

(22) Filed: Mar. 26, 2021

(65) Prior Publication Data

US 2021/0218066 A1 Jul. 15, 2021

Related U.S. Application Data

(63) Continuation of application No. PCT/JP2020/006096, filed on Feb. 17, 2020.

(30) Foreign Application Priority Data

Jul. 12, 2019 (JP) .............................. JP2019-130270

(51) Int. Cl.
*H01M 10/0585* (2010.01)
*H01M 10/617* (2014.01)
*H01M 10/647* (2014.01)
*H01M 10/6553* (2014.01)
*H01M 50/531* (2021.01)
(Continued)

(52) U.S. Cl.
CPC ... *H01M 10/0585* (2013.01); *H01M 10/0525* (2013.01); *H01M 10/617* (2015.04); *H01M 10/647* (2015.04); *H01M 10/6553* (2015.04);

*H01M 50/105* (2021.01); *H01M 50/178* (2021.01); *H01M 50/409* (2021.01); *H01M 50/531* (2021.01); *H01M 50/543* (2021.01)

(58) Field of Classification Search
None
See application file for complete search history.

(56) References Cited

U.S. PATENT DOCUMENTS

2007/0134558 A1* 6/2007 Fukunaga ............. H01M 4/366
429/329
2012/0196172 A1 8/2012 Maeda et al.
(Continued)

FOREIGN PATENT DOCUMENTS

JP 2006244833 9/2006
JP 5016814 * 6/2007 ........ H01M 10/0525
(Continued)

OTHER PUBLICATIONS

International Search Report for International Application PCT/JP2020/006096, dated Apr. 21, 2020.
(Continued)

*Primary Examiner* — Jonathan Crepeau
*Assistant Examiner* — Angela J Martin
(74) *Attorney, Agent, or Firm* — Burris Law, PLLC

(57) ABSTRACT

A nonaqueous electrolyte secondary battery includes a rectangular electrode group, a nonaqueous electrolyte, a band-shaped positive electrode collector lead, a band-shaped negative electrode collector lead, a flat plate-shaped positive terminal, a flat plate-shaped negative terminal and an outer body.

6 Claims, 7 Drawing Sheets

(51) Int. Cl.
*H01M 50/543* (2021.01)
*H01M 50/409* (2021.01)
*H01M 10/0525* (2010.01)
*H01M 50/105* (2021.01)
*H01M 50/178* (2021.01)

(56) References Cited

U.S. PATENT DOCUMENTS

2014/0045045 A1 2/2014 Iyori et al.
2014/0045049 A1 2/2014 Iyori et al.

FOREIGN PATENT DOCUMENTS

| JP | 2012-178326 | * | 9/2012 | ............ H01M 10/04 |
| JP | 5016814 | | 9/2012 | |
| JP | 2012178326 | | 9/2012 | |
| JP | 2013135186 | | 7/2013 | |
| JP | 2014035951 | | 2/2014 | |
| JP | 2014035952 | | 2/2014 | |

OTHER PUBLICATIONS

Motegi, et al., Development of Simulation Technologies for Battery Manufacturer, Part I, Technical Report, Mizuho Information & Research Institute, Inc., 2017, vol. 8(1), pp. 1-6.

* cited by examiner

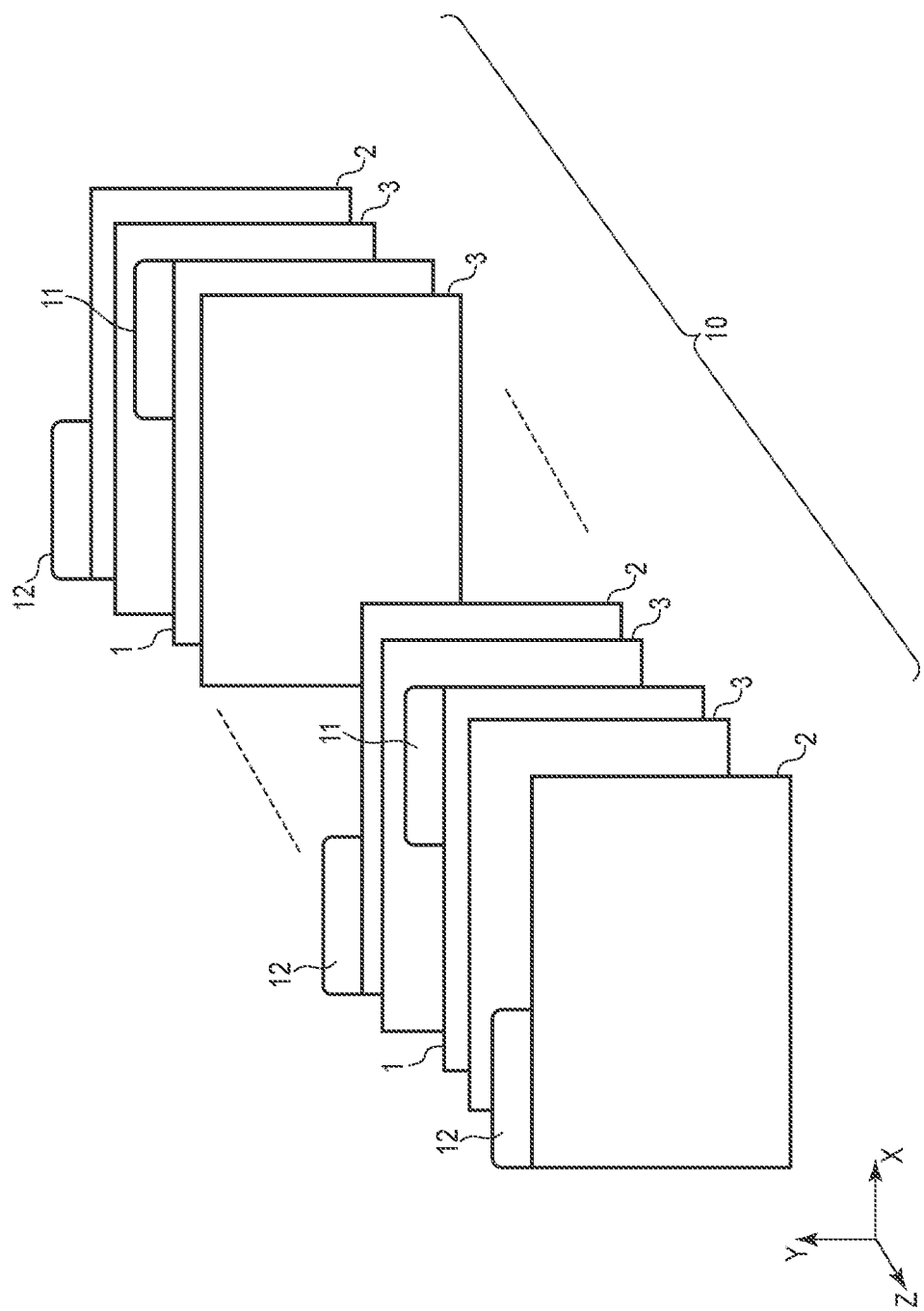
F I G. 2

NONAQUEOUS ELECTROLYTE SECONDARY BATTERY

CROSS-REFERENCE TO RELATED APPLICATIONS

This application is a continuation of International Application No. PCT/JP2020/006096, filed on Feb. 17, 2020, which claims priority to and the benefit of Japanese Patent Application No. 2019-130270 filed on Jul. 12, 2019. The disclosures of the above applications are incorporated herein by reference.

FIELD

The present disclosure relates to a nonaqueous electrolyte secondary battery.

BACKGROUND

In recent years, nonaqueous electrolyte secondary batteries such as lithium ion secondary battery are widely used because of their high energy density characteristics, for example, and are used in mobile devices such as a mobile phone, digital camera, laptop computers, and the like as a power source thereof. Furthermore, demands for the nonaqueous electrolyte secondary battery are increased since it is rechargeable, which is ecologically preferred. Currently, the nonaqueous electrolyte secondary battery is being developed as a storage battery for electronic cars, houses, and business facilities. The nonaqueous electrolyte secondary battery is required to exert good charge/discharge characteristics at a high rate for rapid charge/discharge.

A laminate film, cylinder can, and polygonal can are used as the outer body of the nonaqueous electrolyte secondary battery. Specifically, the nonaqueous electrolyte secondary battery with a laminate film as its outer body is, as compared to the other examples, lighter, with higher heat radiation, and with increased volume energy density, and thus, is widely used.

In the nonaqueous electrolyte secondary battery, a rectangular electrode group is accommodated in the outer body of laminate film. The electrode group includes a positive electrode plate and a negative electrode plate arranged to be opposed to each other with a separator interposed therebetween, and maintains a nonaqueous electrolyte. Band-shaped positive electrode collector lead and negative electrode collector lead are electrically connected to the positive electrode plate and the negative electrode plate, respectively. The positive electrode collector lead and the negative electrode collector lead are electrically connected to a positive terminal and a negative terminal, respectively, in the outer body. The positive terminal and the negative terminal extend to the outside through the sealing member of the outer body.

Non patent literature 1 (Haruki MOTEGI, et al., Development of Simulation Technologies for Battery Manufacturer (Part 1), Technical report of Mizuho Information & Research Institute, Inc. 8(1)) discloses an analysis result of how a position of each collector lead to an electrode group in a lithium ion secondary battery effects a current distribution in the electrode group. In a one-side tab battery, collector leads are connected to one side surface of the electrode group. The analysis result shows that, in the one-side tab battery, when charge/discharge is performed in a high rate, a charge/discharge reaction is concentrated to the proximity of the connection part of each collector lead of the electrode group, and thus, the proximity of the connection part tends to be heated. When the heat is localized in the electro group, current is concentrated to the heated part, and thus, the charge/discharge state in the electrode group becomes uneven. Non patent literature 1 points out that unevenness of the temperature distribution in the electrode group causes unevenness of deterioration, and thus, the battery life may possibly be shortened.

SUMMARY

As mentioned above, the unevenness of temperature distribution of the electrode group shortens the battery life. Thus, the nonaqueous electrolyte secondary battery is required to effectively release the heat generated in the electrode group to even the temperature distribution of the electrode group.

The present invention is to present a nonaqueous electrolyte secondary battery with high heat radiation, in which temperature distribution of an electrode group in the charge/discharge state is evened.

In order to solve said problem, a nonaqueous electrolyte secondary battery according to an embodiment comprises;

a rectangular electrode group including a positive electrode plate and a negative electrode plate arranged to be opposed to each other with a separator interposed therebetween, the group having one side surface;

a nonaqueous electrolyte maintained in the electrode group;

a band-shaped positive electrode collector lead electrically connected to the positive electrode plate in the side surface;

a band-shaped negative electrode collector lead electrically connected to the negative electrode plate in the side surface;

a flat plate-shaped positive terminal electrically connected to one end of the positive electrode collector lead;

a flat plate-shaped negative terminal electrically connected to one end of the negative electrode collector lead; and an outer body formed of one or two laminate films, the outer body including a sealing member formed by sealing periphery edges of the laminate films, and a container member surrounded by the sealing member to contain the electrode group, wherein the container member includes a first container member and a second container member divided by a direction parallel to the direction along the side surface, the electrode group, positive electrode collector lead, and part of the negative electrode collector lead are accommodated in the first container member, the positive electrode collector lead, remaining part of the negative electrode collector lead, and part of the positive terminal and the negative terminal connected to each collector lead are accommodated in the second container member, the positive electrode collector lead and the negative electrode collector lead extend form the side surface of the electrode group to the second container member, and the positive terminal and the second terminal extend from the second container member to the outside through the sealing member.

According to the present invention, a nonaqueous electrolyte secondary battery with high heat radiation, in which temperature distribution of an electrode group in the charge/discharge state is evened can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a disassembled perspective view of the electrode group of FIG. 1.

FIG. 4(a) is a plan view as being viewed from a direction Z and FIG. 4(b) is a plan view as being viewed from a direction X.

DETAILED DESCRIPTION

Figure 1:
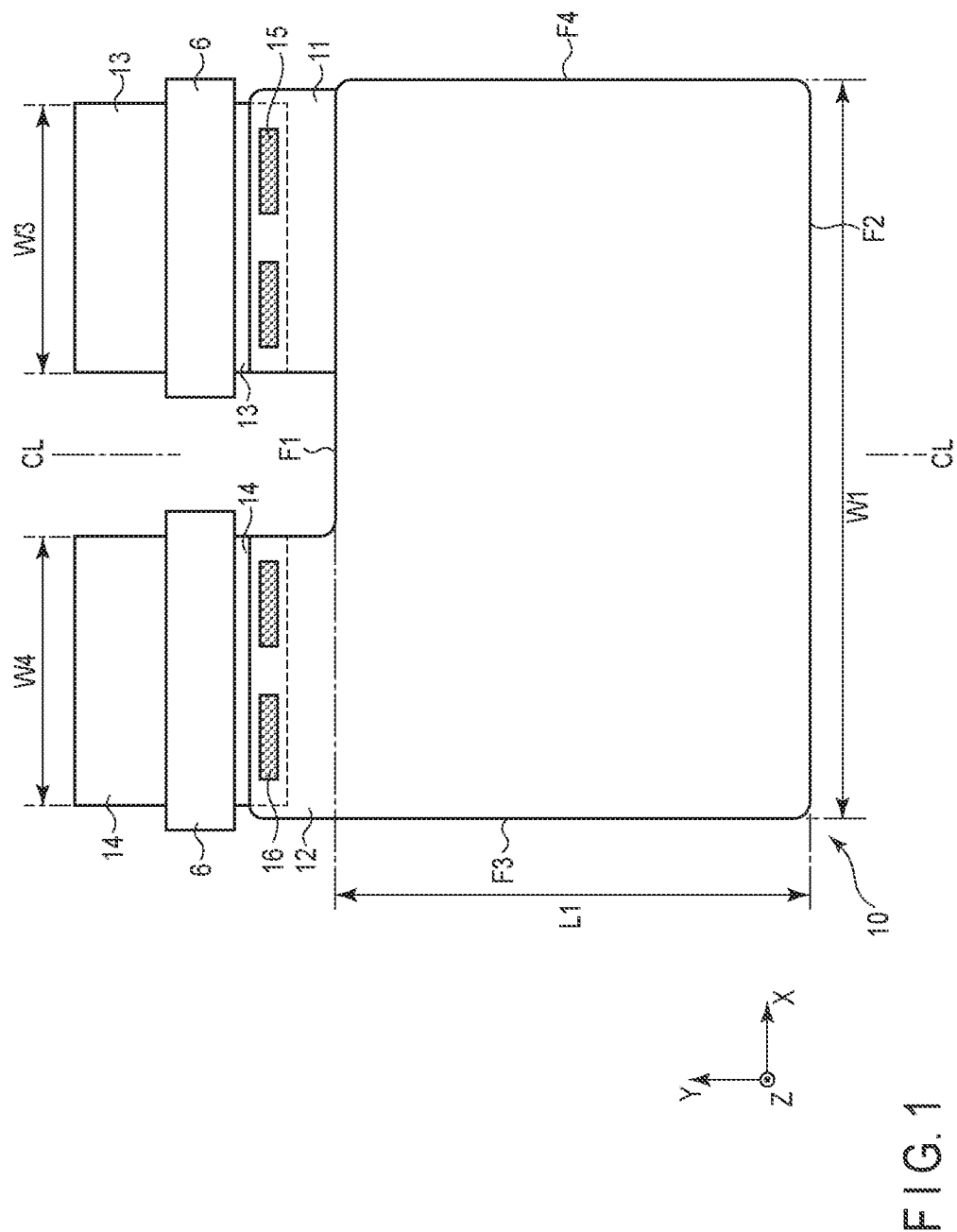
FIG. 1 is a plan view of an electrode group used in a nonaqueous electrolyte secondary battery of an embodiment.

Hereinafter, some embodiments will be explained with reference to the accompanying drawings.

Note that the disclosure is merely an example, and proper changes within the spirit of the invention, which are easily conceivable by a skilled person, are included in the scope of the invention as a matter of course. In some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In the specification and drawings, the same elements as those described in connection with preceding drawings are denoted by like reference numerals, and a detailed description thereof may be omitted.

(Structure of Nonaqueous Electrolyte Secondary Battery)

Now, the nonaqueous electrolyte secondary battery of the present embodiment will be explained as a laminated lithium ion secondary battery with reference to FIGS. 1 to 6.

Figure 3:
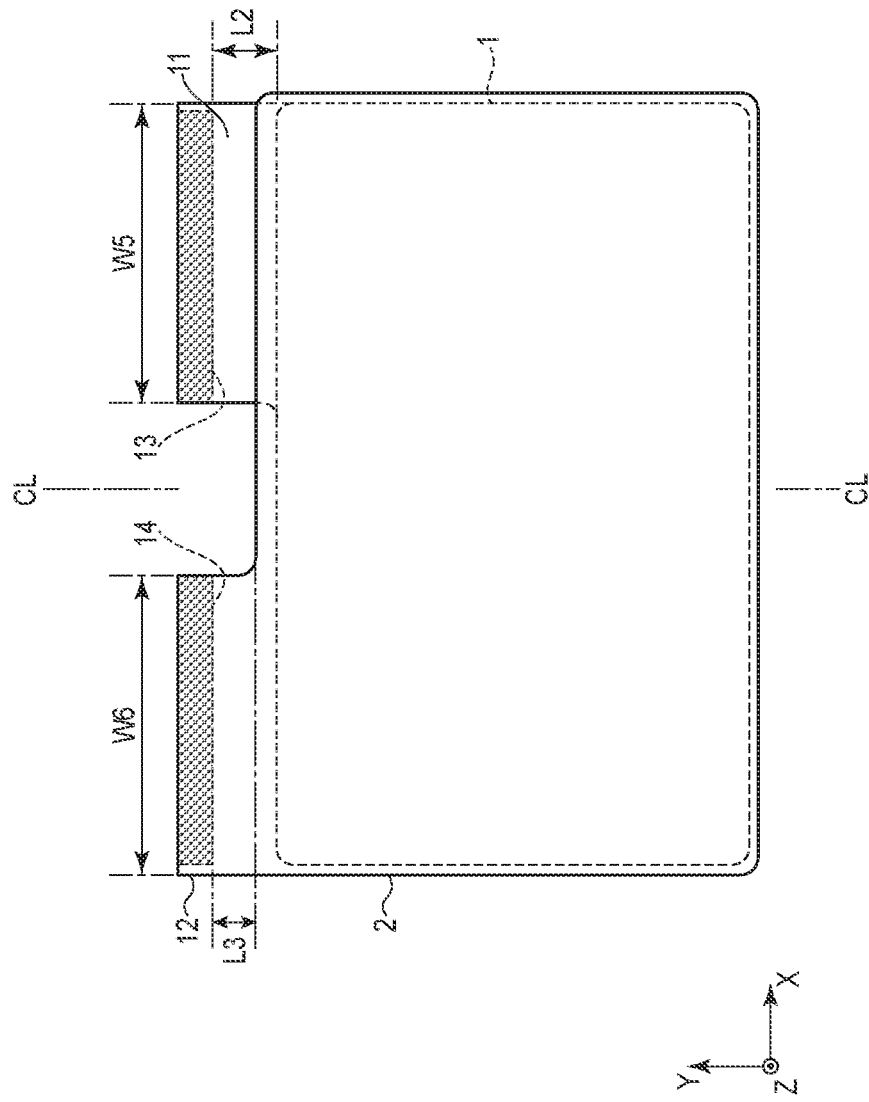
FIG. 3 is a plan view illustrating a state where a pair of a positive electrode plate and a negative electrode plate are overlapped with each other in the electrode group of FIG. 1.
Figure 4:
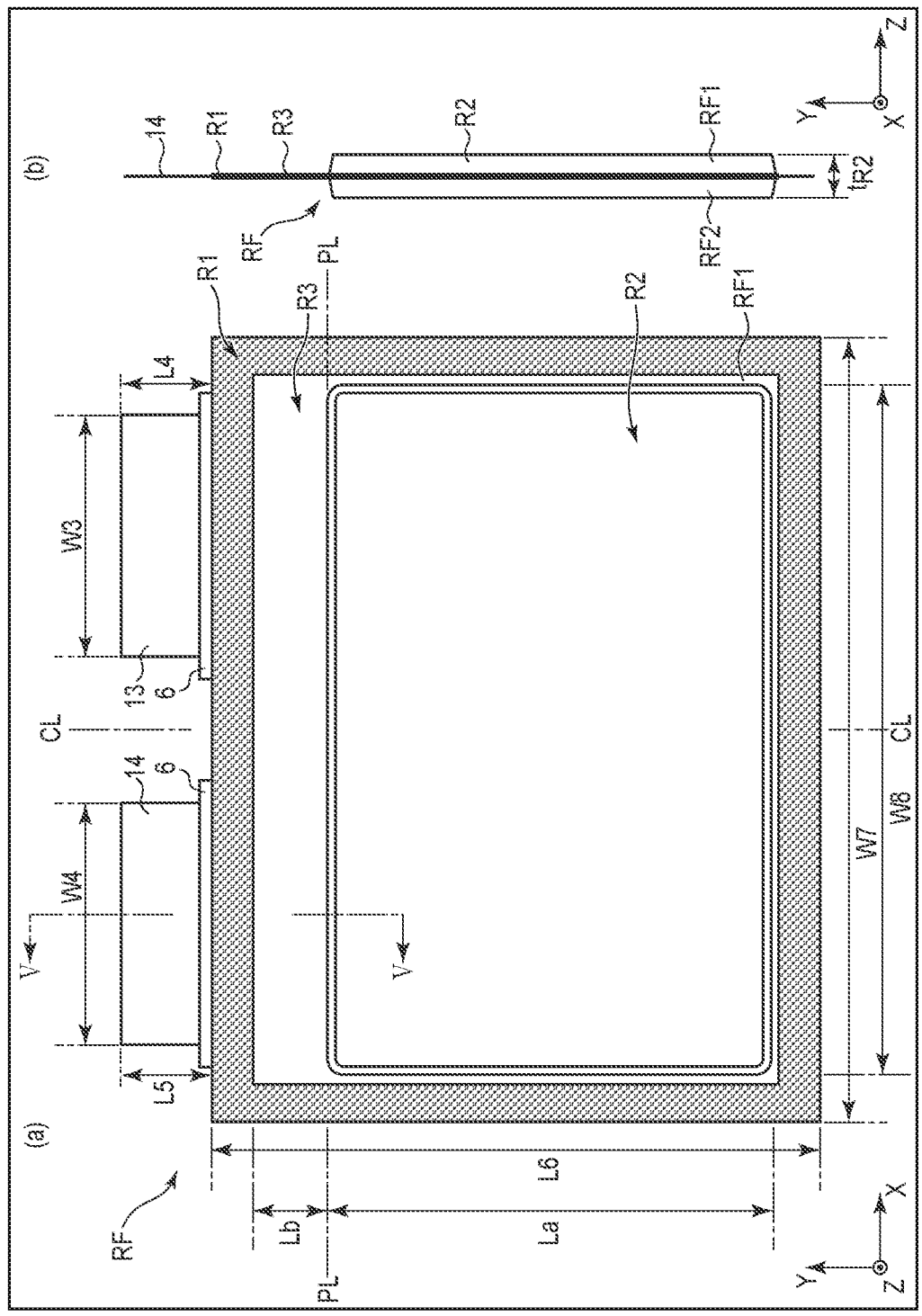
FIG. 4 illustrates the nonaqueous electrolyte secondary battery of the present embodiment, where
Figure 5:
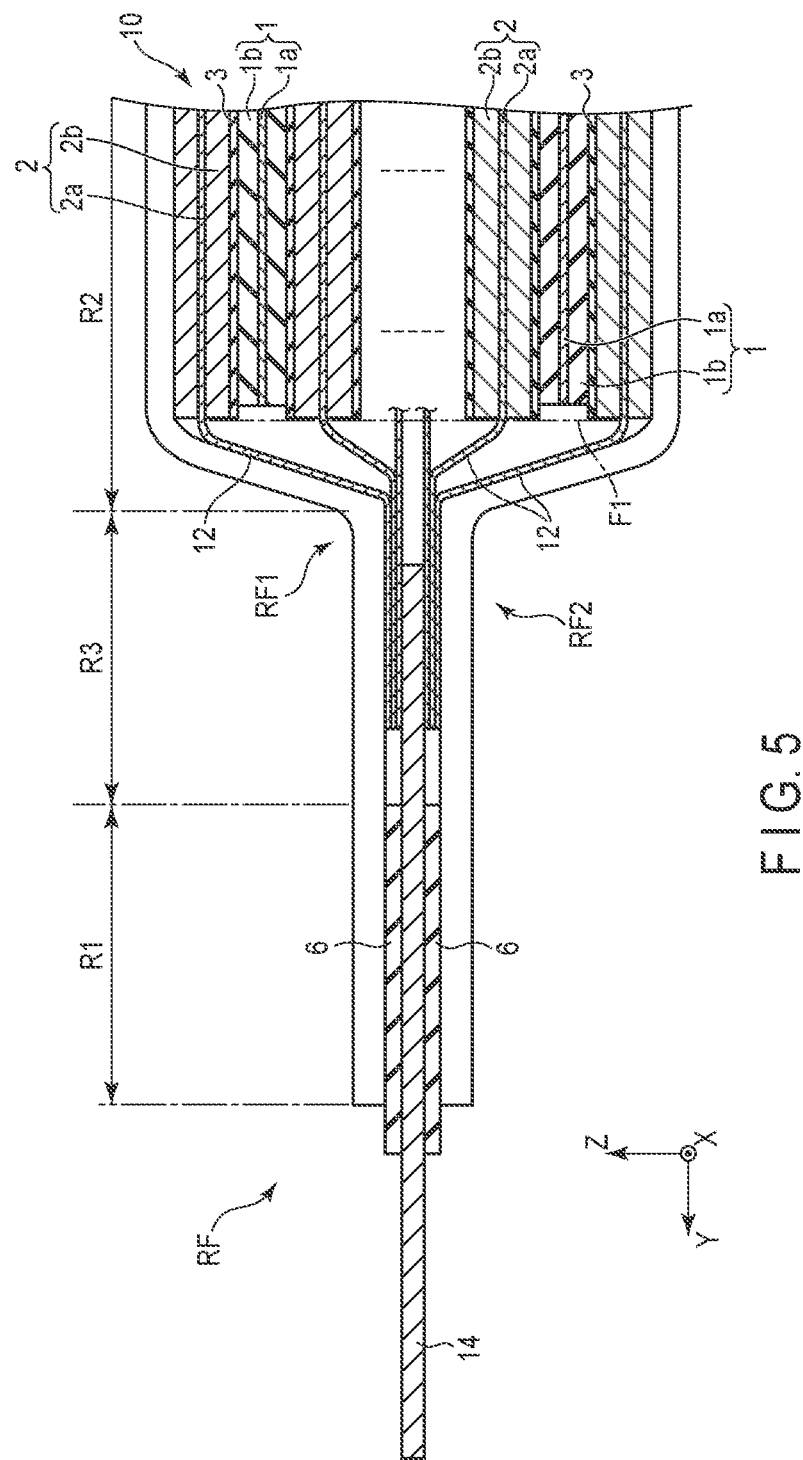
FIG. 5 is a cross-sectional view of line V-V of FIG. 4(a).
Figure 6:
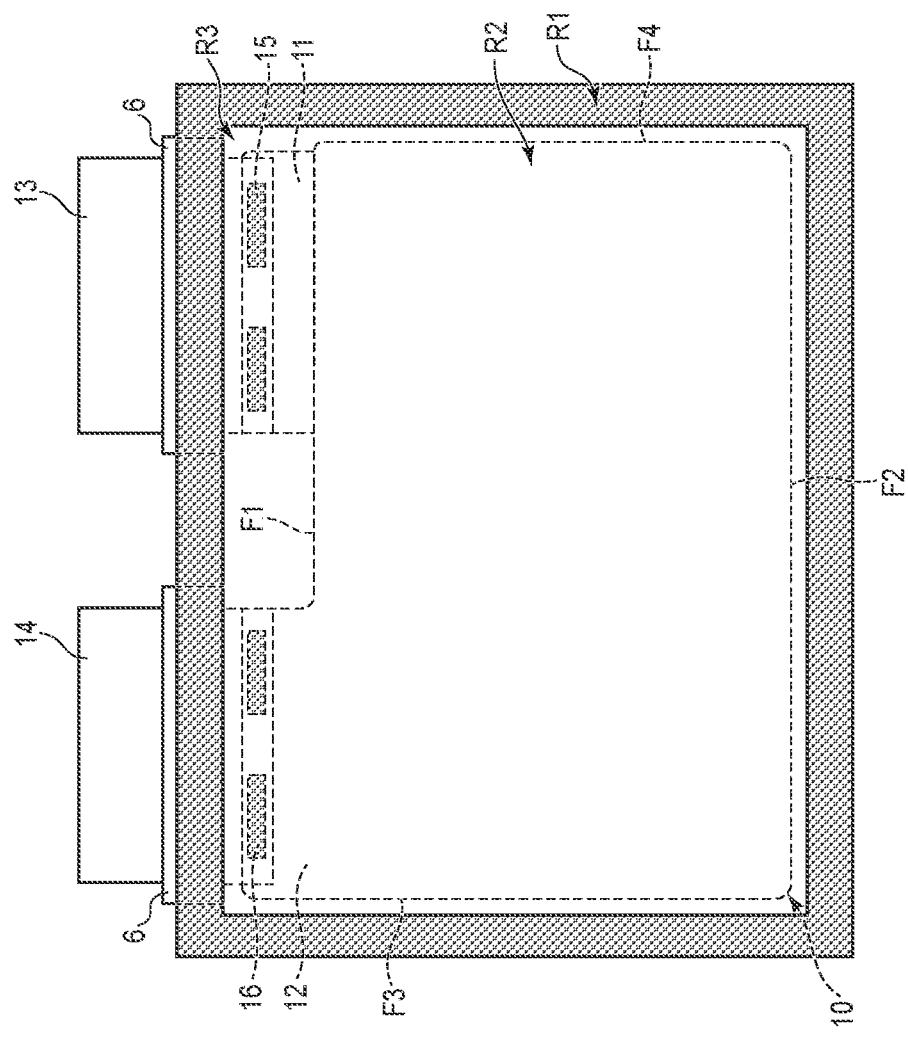
FIG. 6 is a plan view illustrating a state where the electrode group of FIG. 1 is accommodated in the outer body.

FIG. 1 is a plan view of the internal structure of the laminated lithium ion secondary battery excluding the outer body thereof. FIG. 2 is a perspective view of an electrode group 10 of FIG. 1 in a disassembled manner. FIG. 3 is a plan view illustrating a state where a pair of a positive electrode plate 1 and a negative electrode plate 2 of the electrode group 10 of FIG. 1 are overlapped with each other. FIG. 4 illustrates the laminated lithium ion battery of the present embodiment, where FIG. 4(a) is a plan view as being viewed from a direction Z and FIG. 4(b) is a plan view as being viewed from a direction X. FIG. 5 is a cross-sectional view, taken along line V-V of FIG. 4(a). FIG. 6 is a plan view of the electrode group 10 of FIG. 1 accommodated in the outer body.

The laminated lithium ion secondary battery includes, as in FIG. 1, a rectangular (for example, cuboid) electrode group 10. The electrode group 10 includes a first side surface F1 and a second side surface F2 which are opposed to each other. The electrode group 10 includes different side surfaces which are opposed to each other, that is, a third side surface F3 and a fourth side surface F4. Note that, in the present application, a direction parallel to the direction along the first side surface F1 and the second side surface F2 is defined as direction X, direction parallel to the direction along the third side surface F3 and the fourth side surface F4 is defined as direction Y, and direction perpendicular to the directions X and Y is defined as direction Z. The electrode group 10 includes a width W1 in the direction X, and a length L1 in the direction Y which is shorter than the width W1.

The electrode group 10 includes a positive electrode plate 1 and a negative electrode plate 2 arranged to be opposed to each other with a separator 3 therebetween. The electrode group 10 maintains a nonaqueous electrolyte. The nonaqueous electrolyte is a nonaqueous electrolyte solution containing a nonaqueous solvent and electrolytes, for example. The components of the nonaqueous electrolyte will be described later. The electrode group 10 is structured as in FIG. 2 such that a plurality of positive electrode plates 1 and a plurality of negative electrode plates 2 are laminated in the direction Z while a separator 3 is interposed between the positive electrode plate 1 and the negative electrode plate 2.

The positive electrode plate 1 includes, as in FIG. 5, a positive electrode collector 1a and a positive electrode layer 1b formed on the both surfaces of the collector 1a. The positive electrode collector 1a is, for example, a rectangular aluminum foil. The positive electrode collector 1a has a thickness of 10 to 30 µm, for example. The positive electrode layer 1b contains a positive electrode active substance which can collect/release lithium ions, and contains, for example, the positive electrode active substance, conductive agent, and binding agent. The components of the positive electrode plate 1 will be described later.

A band-like positive electrode collector lead 11 is electrically connected to a side surface of the positive electrode plate 1 positioned in the first side surface F1 side of the electrode group 10. The positive electrode collector lead 11 is connected to the fourth side surface F4 side with respect to the center line CL in the direction X as in FIG. 1. The positive electrode collector lead 11 is formed integrally with the positive electrode collector 1a, for example. The positive electrode collector lead 11 has a thickness $t_{11}$ of 10 to 30 µm, for example.

The separator 3 is a lithium ion transmissive porous film, and is, for example, a porous polyolefin film having a thickness of 5 to 30 µm. The components of the separator 3 will be described later.

The negative electrode plate 2 includes a negative electrode collector 2a and a negative electrode layer 2b formed on the both surfaces of the collector 2a. The negative electrode collector 2a is, for example, a rectangular copper foil. The negative electrode collector 2a has a thickness of 6 to 14 µm, for example. The negative electrode layer 2b contains a negative electrode active substance which can collect/release lithium ions, and contains, for example, the negative electrode active substance, conductive agent, and binding agent. The components of the negative electrode plate 2 will be described later.

A band-like negative electrode collector lead 12 is electrically connected to a side surface of the negative electrode plate 2 positioned in the first side surface F1 side of the electrode group 10. The negative electrode collector lead 12 is connected to the third side surface F3 side with respect to the center line CL in the direction X as in FIG. 1. The negative electrode collector lead 12 is formed integrally with the negative electrode collector 2a, for example. The negative electrode collector lead 12 has a thickness $t_{12}$ of 6 to 14 μm, for example.

A battery structured as above with the positive electrode collector lead 11 and the negative electrode collector lead 12 extending from the first side surface F1 of the electrode group 10 is referred to as one-side tab battery.

As shown in FIG. 5 below, the negative electrode collector lead 12 extend from the side surface of the negative electrode plate 2 positioned in the first side surface F1 side of the electrode group 10. The negative electrode collector leads 12 are converged to, for example, the center side along the direction of the lamination of the electrode group 10 (direction Z) to be connected to each other. Although this is not shown, the positive electrode collector leads 11 extend similarly from the side surface of the positive electrode plate 1 positioned in the first side surface F1 side of the electrode group 10. The positive electrode collector leads 11 are, as with the negative electrode collector leads 12, converged and connected.

One end of a positive terminal 13 is electrically connected to the positive electrode collector lead 11. The positive terminal 13 is, for example, a flat rectangular aluminum plate. The positive terminal 13 has a thickness of 0.08 to 1.0 mm and a width W3 in the direction X, and extends in the direction Y, for example. To both surfaces of the positive terminal 13, converged tips of the positive electrode collector leads 11 are connected via ultrasonic welding, resistance welding, or the like. The positive electrode collector lead 11 and the positive terminal 13 are connected via a spot welding part 15, for example.

One end of a negative terminal 14 is electrically connected to the negative electrode collector lead 12. The negative terminal 14 is, for example, a flat rectangular copper plate. The negative terminal 14 has a thickness of 0.08 to 1.0 mm and a width W4 in the direction X, and extends in the direction Y, for example. To both surfaces of the negative terminal 14, converged tips of the negative electrode collector leads 12 are connected via ultrasonic welding, resistance welding, or the like. The negative electrode collector lead 12 and the negative terminal 14 are connected via a spot welding part 16, for example.

In the part of each of the terminals 13 and 14 passing through a sealing member R1 of an outer body RF which will be described later, a heat sealing resin part 6 is formed to cover the circumferential surface of the terminals 13 and 14. The heat sealing resin part 6 is heat sealed with heat sealing resin layers of laminate films RF1 and RF2 which will be described later. The heat sealing resin part 6 increases adhesion strength of the part of the sealing member R1 where each of the terminals 13 and 14. The heat sealing resin part 6 is formed of a thermoplastic resin such as polyolefin.

As in FIG. 3, the positive electrode plate 1 is, for example, formed to be slightly smaller than the negative electrode plate 2 in the area. The hatched part in FIG. 3 illustrates the area where the collector leads 11 and 12 and the terminals 13 and 14 overlap with each other. The collector leads 11 and 12 include widths W5 and W6 in the direction X, respectively. The positive electrode collector lead 11 has a length L2 from one end connected to the positive electrode plate 1 to the other end connected to the positive terminal 13. The negative electrode collector lead 12 has a length L3 from one end connected to the negative electrode plate 2 to the other end connected to the negative terminal 14.

In the laminated lithium ion secondary battery, the above-described electrode group 10 is accommodated in the outer body RF including one or two laminate films RF1 and RF2.

The outer body RF is formed of two laminate films RF1 and RF2 as in FIGS. 4(b) and 5. The laminate films RF1 and RF2 are, for example, each shaped as a rectangle with a container concave part shaped as rectangular hollow shape with a bottom, and a rectangular frame-like flat part positioned in the periphery of the container concave part. The outer body RF has, for example, a rectangle having a width W7 in the direction X and a length L6 in the direction Y. The outer body RF has a maximum thickness of $t_{R2}$, for example. The flat part is formed such that the area in the first side surface F1 is greater than are the areas in the second side surface F2, third side surface F3, and fourth side surface F4. The laminate films RF1 and RF2 are each structured with a protection layer (outer layer), metal layer (middle layer), and heat sealing resin layer (inner layer) laminated in this order. The components of the outer body RF will be described later.

The outer body RF includes a rectangular frame-like sealing member R1, and a container member which is surrounded by the sealing member R1 to accommodate the electrode group 10. The sealing member R1 is formed by sealing the heat sealing resin layers positioned in the peripheries of the flat parts of the laminate films RF1 and RF2. The rectangular frame-like sealing member R1 has the same width in the first side surface F1, second side surface F2, third side surface F3, and fourth side surface F4 sides. Thus, on the flat parts with a wider area positioned in the first side surfaces F1 side of the laminate films RF1 and RF2, a non-sealed area surrounded by a reverse C letter-like part of the sealing member R1. That is, the non-sealed area is the area where the heat sealing resin layers of the laminate films RF1 and RF2 opposed to each other are not sealed.

The container member includes a first container part R2 and a second container part R3 divided by the direction X. The first container part R2 is, for example, a rectangular area of the container member in the opposite side of the extension side of each of the terminals 13 and 14 about the dividing line PL. The second container part R3 is, for example, a rectangular area of the container member in the extension side of each of the terminals 13 and 14 about the dividing line PL.

The first container part R2 is an area defined by the container concave parts of the laminate films RF1 and RF2 opposed to each other. In the first container part R2, for example, a part of the electrode group 10, positive electrode collector lead 11, and negative electrode collector lead 12 is accommodated. The first container part R2 has a shape along the accommodated electrode group 10, for example. The first container part R2 is shaped as a cuboid having a width W8 in the direction X, length La in the direction Y, and thickness $t_{R2}$ in the direction Z. As in FIG. 5, the electrode group 10 and a part of the negative electrode collector lead 12 extending from the electrode group 10 before being converged are accommodated in the first container part R2. Note that, although this is not shown, a part of the positive electrode collector lead 11 is accommodated in the first container part R2 as with the negative electrode collector lead 12. As in FIG. 4(a), the first container part R2 accommodating the electrode group 10 is adjacent to the sealing member R1 in the third side surface F3, second side surface F2, and fourth side surface F4, and is adjacent to the second container part R3 in the first side surface F1.

The second container part R3 is, for example, a non-sealed area of two flat parts of the laminate films RF1 and RF2 opposed to each other excluding the sealing member R1. The second container part R3 has a length Lb in the direction Y. As in FIG. 5, the second container part R3 accommodates a flat part of the negative electrode collector lead 12 and a flat part of the negative terminal 14 connected to the negative electrode collector lead 12. Note that, although this is not shown, the positive electrode collector lead 11 and a part of the positive terminal 13 connected to the positive electrode collector lead 11 are partly accommodated in the second container part R3 as with the negative electrode collector lead 12 and the negative terminal 14. As in FIGS. 5 and 6, each of the collector leads 11 and 12 extends in the direction Y from the first side surface F1 of the electrode group 10 in the first container part R2 to the inside of the second container part R2. The collector leads 11 and 12 and terminals 13 and 14 partly overlap with each other in the second container part R3 to be connected in two spot welding parts 15 and 16, respectively, as described above. The terminals 13 and 14 extend from the second container part R3 through the sealing member R1 to the outside in the direction Y. The areas of terminals 13 and 14 of the lengths L4 and L5 in the direction Y are, as in FIG. 4(a), exposed to the outside of the outer body RF.

Such a laminated lithium ion secondary battery generates, in the charge/discharge state, heat caused by reaction heat in the electrode group 10. In the above-described one-side tab battery, the charge/discharge reaction tends to concentrate in the proximity of the connection part of the collector leads 11 and 12 of the electrode group 10, and the part tends to become a high temperature. If the electrode group 10 locally becomes a high temperature, and current is focused to the high temperature part, and thus, the charge/discharge state in the electrode group 10 becomes uneven, and the battery life becomes shorter. Thus, it is required that the heat generated in the electrode group 10 is effectively released to the outside to even the temperature distribution of the electrode group 10.

The heat generated in the electrode group 10 is mainly transferred from the collector leads 11 and 12 in the outer body RF to the terminals 13 and 14 connected to the leads, and through the sealing member R1, is released to the outside the of the outer body RF from a part of the terminals 13 and 14 exposed to the outside. Specifically, in the charge/discharge state with high current, a high temperature heat tends to be generated in the proximity of the connection part of the collector leads 11 and 12 of the electrode group 10. In such a case, the heat release to the outside through the terminals 13 and 14 limits the heat release of the entire electrode group 10. Thus, the second container part R3 functions as a main part of the heat release part of the battery. When the electrode group 10 is heated, the heat is scattered to the collector leads 11 and 12 accommodated in the container part R3, and the heat is evened between the electrode group 10 and the collector leads 11 and 12. Thus, the heat is transferred to the terminals 13 and 14, and is also transferred to the metal layer of the laminate films RF1 and RF2. Therefore, the heat release performance of the electrode group 10 is improved. Here, the heat generated in the electrode group 10 is transferred greatly when the cross-sectional area of the terminals 13 and 14 is increased. However, when the terminals 13 and 14 are formed thicker, a gap tends to be produced between seals when the terminals 13 and 14 are interposed between the laminate films RF1 and RF2 are heat sealed. When the terminals 13 and 14 are formed thicker, it may cause fluid leakage, or water intrusion, or the like, and thus, terminals 13 and 14 should be formed thinner.

As in FIG. 4(a), the length La of the first container part R2 in the direction Y and the length Lb of the second container part R3 should satisfy 0.1≤Lb/(La+Lb)≤0.2. Since the second container part R3 functions as a main part of the heat releasing part, when the value of Lb becomes greater, the amount of heat radiation of the electrode group 10 becomes greater. Thus, the value of Lb should be designed based on the amount of heat radiation of the electrode group 10. If the value of Lb is small (Lb/(La+Lb)<0.1), there may be a possibility that the heat generated in the electrode group 10 is not effectively released to the outside. On the other hand, if the value of Lb is too large (0.2<Lb/(La+Lb)), the weight of the second container part R3 which does not contribute to the charge/discharge increases, and thus, the specific energy of the battery decreases. In consideration of the above, 0.1≤Lb/(La+Lb)≤0.2 should be satisfied to achieve a sufficient heat radiation of the battery while suppressing a decrease in specific energy of the battery.

When the heat resistance of the part of the positive electrode collector lead 11 from one end connected to the positive electrode plate 1 to the other end connected to the positive terminal 13 is r1, and the heat resistance of the part of the negative electrode collector lead 12 from one end connected to the negative electrode plate 2 to the other end connected to the negative terminal 14 is r2, a ratio of r2/r1 is, preferably, 0.7 or more and 1.4 or less.

The heat generated in the electrode group 10 in the charge/discharge state is released through the collector leads 11 and 12 as described above, and thus, if there is a greater difference between r1 and r2, there may be a difference in the heat radiation performance between the positive electrode plate 1 and the negative electrode plate 2 which may cause uneven deterioration of the plates. When the ratio of r2/r1 is defined as 0.7 or more and 1.4 or less, the heat released through the collector leads 11 and 12 can be evened, and the temperature distribution of the electrode group 10 in the charge/discharge state can further be evened.

As in FIG. 3, the heat resistance r1 is derived from the following formula (1) based on width W5 of the part of the positive electrode collector lead 11, length L2 and thickness $t_{11}$ of the part, and heat conductive ratio $\lambda_1$.

$$r1[K/W] = (1/\lambda_1) \cdot (L2/(W5 \cdot t_{11})) \quad (1)$$

On the other hand, the heat resistance r2 is derived from the following formula (2) based on width W6 of the part of the negative electrode collector lead 12, length L3 and thickness $t_{12}$ of the part, and heat conductive ratio $\lambda_2$.

$$r2[K/W] = (1/\lambda_2) \cdot (L3/(W6 \cdot t_{12})) \quad (2)$$

Note that r1 and r2 can be changed by adjusting each of the dimensions in consideration of each of the heat conductive ratios $\lambda_1$ and $\lambda_2$ of the collector leads 11 and 12. For example, aluminum generally used as a material of the positive electrode collector lead 11 has approximately half the heat conductive ratio as compared to copper which is generally used as a material for the negative electrode collector lead 12. Thus, if other dimensions (widths and lengths) are the same, thickness t12 of the negative electrode collector lead 12 is set as twice as thickness t11 of the positive electrode collector lead 11 to set the ratio of r2/r1 to the above range.

As in FIG. 5, the electrode group 10 is, preferably, formed as a cuboid and the first side surface F1 is, preferably, the side surface of the longitudinal direction of the electrode group 10. If the first side surface F1 is, hypothetically, the side surface of the latitudinal direction of the electrode group 10, a gap between the part of the electrode group 10 in the proximity of the heated terminal and the part of the electrode group 10 which is farthermost from the terminal becomes long in the direction to which the terminal projects. Thus, in a case where the first side surface F1 is the side surface of the electrode group 10 in the latitudinal direction, a temperature difference in the electrode group 10 becomes greater as compared to a case where the first side surface F1 is the side surface of the electrode group 10 in the longitudinal direction. Furthermore, if the first side surface F1 is the side surface of the electrode group 10 in the longitudinal direction, the widths of the collector leads 11 and 12 connected to the electrode group 10 can be increased. Thus, the heat radiation from the electrode group 10 to the collector leads 11 and 12 can be performed more effectively.

When the width of the first side surface F1 of the electrode group 10 is W1 (W1 of FIG. 1), and a sum of the widths of the collector leads 11 and 12 is W2 (that is, sum of W5 and W6 of FIG. 3), the ratio W2/W1 should be 0.6 or more and 0.9 or less.

As described above, the heat generated in the electrode group 10 is concentrated in the area in the proximity of the connection part of the collector leads 11 and 12 of the electrode group 10. Thus, effective heat radiation performed by increasing the widths of the collector leads 11 and 12 directly connected to the positive electrode plate 1 and the negative electrode plate 2 is important. When the ratio of W2/W1 is 0.6 or more and 0.9 or less, the heat radiation of the electrode group 10 to the collector leads 11 and 12 can be performed effectively with the greater widths of the collector leads 11 and 12. When the ratio of W2/W1 is below 0.6, the effect of heat radiation from the electrode group 10 to the collector leads 11 and 12 decreases, and thus, effective heat radiation of the electrode group 10 to the collector leads may not be performed. In an example, if the ratio of W2/W1 is 0.5, a sum of the widths of the collector leads 11 and 12 becomes ½ as compared to the electrode group 10, and thus, the effect of the heat radiation from the electrode group 10 to the collector leads 11 and 12 becomes half accordingly. If the ratio of W2W1 is above 0.9, the heat radiation from the electrode group 10 to the collector leads is performed effectively while a gap between the collector leads 11 and 12 becomes narrower, and a possibility of short circuit increases.

The first container part R2 to accommodate the electrode group 10 functions as a heat generation part of the battery. The heat generated by the electrode group 10 is released to the outside from the surface of the electrode group 10 through the collector leads 11 and 12, terminals 13 and 14, and metal layers of laminate films RF1 and RF2. Thus, the part of the outer body RF excluding the first container part R2, for example, the second container part R3 and the sealing member R1, and part of the terminals 13 and 14 exposed to the outside function as the heat releasing part of the battery. When the total surface area of the first container part R2 (heat releasing part) is S1, and the total surface area of the heat releasing part is S2, the ratio S2/S1 is, preferably, set to 0.4 or more and 1.0 or less. The total areas S1 and S2 are a sum of the areas of the first container part R2 (heat generation part) and the heat releasing part, respectively, as being projected from the forward direction and the opposite direction of the directions X, Y, and Z (six directions). Note that if the thicknesses of the members of the heat releasing part (for example, thicknesses of second container part R3, sealing member R1, and terminals 13 and 14) are small such as 2 mm or less, the total surface area S2 does not include the total surface area of the members in the thickness direction. That is, if the total surface area S2 can be calculated from the sum of areas as being projected from the forward and opposite directions in the direction Z (two directions) if the thicknesses of the members are small. On the other hand, in the total surface area S1, the thickness $t_{R2}$ of the first container part R2 is generally 2 mm or more, and thus, the total surface area S3 in the thickness direction (sum of the areas as being projected from the forward directions and the opposite direction in the directions X and Y (four directions)) is included.

By defining the ratio of S2/S1 as 0.4 or more and 1.0 or less, the total surface area S2 of sufficient heat releasing part can be secured based on the total surface area S1 of the first container part R2 (heat generation part). Thus, the battery with the above ratio of S2/S1 can effectively release the heat generated in the electrode group 10, and the temperature distribution of the electrode group 10 can be evened. Thus, the current distribution of the electrode group 10 of the battery can be evened, and deterioration of the battery life because of local deterioration of each active material of the positive electrode plate 1 and the negative electrode plate 2 can be suppressed. If the ratio of S2/S1 is below 0.4, the total surface area S2 of the heat releasing part becomes small, the effective heat radiation may not be performed, and thus, the temperature distribution of the electrode group 10 may become uneven. On the other hand, if ratio of S2/S1 is above 1.0, when the weight of the heat releasing part which does not contribute to the charge/discharge increases, the specific energy of the battery may decrease.

If the total surface area of the first container part R2 (heat generation part) is S3, and the total surface area of the heat releasing part is S2, the ratio of S2/S3 is, preferably, 4.5 or more.

The total surface area S3 of the first container part R2 in the thickness direction becomes greater in proportion to the thickness of the electrode group 10 accommodated (in correlation with the number of laminated layers of the electrode group 10), generally. The heat generated from the electrode group 10 increases in proportion to the total surface area S3, and the heat tends to be accumulated, and thus, it is necessary to increase the heat radiation of the battery by increasing the total surface area S2 of the heat releasing part. If the ratio of S2/S3 is 4.5 or more, the heat release can be performed more effectively, and the temperature distribution of the electrode group 10 in the charge/discharge state can be evened.

Note that the outer body RF is not limited to the structure with two laminate films RF1 and RF2, and the outer body RF may be formed of one laminate film bent by several times. If such a single laminate film is used, three sides of peripheral edges are sealed excluding the bending part to form the sealing member R1, and the sealing member R1 becomes a reversed C letter shape. Furthermore, a phrase of "the container member is surrounded by the sealing member R1" is not limited to a case where the four sides of the container member are surrounded by the sealing member R1, and may be a case where the three sides of the container member are surrounded by the sealing member R1.

Furthermore, if the outer body RF is formed of two laminate films RF1 and RF2, each of films may not have a container concave part, and instead, one film may have a container concave part and a flat part as in the lamination film RF1 while the other lamination film RF2 may have a flat part. In that case, the first container part R2 corresponds to the area defined by the container concave part of one lamination film RF1 and the flat part of the other laminate film RF2 opposed to the container concave part.

As the nonaqueous electrolyte secondary battery is, in the above example, a laminate lithium ion secondary battery; however, no limitation is intended thereby, and it can be applied to various known nonaqueous electrolyte batteries. For example, the nonaqueous electrolyte secondary battery may be a wound lithium ion secondary battery in which electrode group is wound.

(Structural Materials of Nonaqueous Electrolyte Secondary Battery)

Now, materials in a case where the nonaqueous electrolyte secondary battery is a lithium ion secondary battery will be explained.

<Positive Electrode Plate 1>

The positive electrode layer 1b includes, for example, a positive electrode active material, conductive agent, and binding agent.

The positive electrode active material is not limited specifically, and is a known or commercially-available material, for example, a lithium containing transition metal oxide such as $LiCoO_2$, $LiNiO_2$, $LiMn_2O_4$, $LiFePO_4$, $LiCo_{1/3}Ni_{1/3}Mn_{1/3}O_2$, $LiCo_{0.15}Ni_{0.8}Al_{0.05}O_2$, or $LiNi_{0.5}Mn_{1.5}O_4$.

The conductive agent is not limited specifically, and is a known or commercially-available agent, for example, carbon black such as acetylene black or Ketjen black, carbon nanotube, carbon fiber, activated carbon, or graphite.

The binding agent is not limited specifically, and is a known or commercially-available agent, for example, polyvinylidene fluoride (PVdF), polytetrafluoroethylene (PTFE), polyvinylpyrrolidone (PVP), polyvinyl chloride (PVC), polyethylene (PE), polypropylene (PP), ethylene-propylene copolymer, styrene butadiene rubber (SBR), or acrylic resin.

The positive electrode collector 1a is not limited specifically, and is a known or commercially-available material, for example, a metal foil such as aluminum foil, copper foil, or stainless foil, or a porous metal such as porous aluminum.

<Negative Electrode Plate 2>

The negative electrode layer 2b contains, as described above, a negative electrode active material, conductive agent, and binding agent, for example.

The negative electrode active material is not limited specifically, and is a known or commercial-available material, for example, a carbon material such as natural graphite, artificial graphite, mesocarbon microbeads (MCMB), hard carbon, or soft carbon, metal material which can absorb/release lithium such as Al, Si, or Sn and alloy material including such metal materials, or metal oxide material such as $SiO$, $SiO_2$, lithium titanium oxide ($Li_4Ti_5O_{12}$).

The binding agent is not limited specifically, and is a known or commercially-available agent, for example, PTFE, PVdF, fluororubber, SBR, carboxymethyl cellulose (CMC), core shell binder, polyvinyl alcohol, polyimide, and imide resin such as polyamide-imide.

The conductive agent may or may not be added, and if added, the same conductive agent used for the positive electrode can be used.

The negative electrode collector 2a is not limited specifically, and is a known or commercially-available material, for example, a metal foil such as aluminum foil, copper foil, or stainless foil, or a porous metal such as porous aluminum.

<Separator 3>

The separator is not limited specifically, and is a known or commercially-available separator, for example, a synthetic resin non-woven cloth formed of a polyolefin resin such as PE or PP, or PTFE, or a prous sheet.

<Nonaqueous Electrolyte>

The nonaqueous electrolyte is not limited specifically, and is a known or commercially-available electrolyte, for example, lithium salt such as $LiBF_4$, $LiPF_6$, $LiAsF_6$, $LiCF_3$, $CFO$, $LiSO_3CF_3$, $LiCF_2CF_2SO_3$, $LiClO_4$, $LiN(COCF_2CF_3)_2$, $LiN(SO_2CF_3)_2$ as single or mixture. The concentration of electrolyte is, for example, 0.3 mol/L to 3.0 mol/L.

The nonaqueous solution is not limited specifically, and is a known or commercially-available solution, for example, ethylene carbonate (EC), ethyl methyl carbonate (EMC), γ-butyrolactone, diethyl carbonate, dimethyl carbonate (DMC) as a main solvent. Furthermore, as a sub solvent to be mixed to the main solvent, propylene carbonate, sulfolane, dimethoxyethane, diethoxyethane, 2-methyl-tetrahydrofuran, and various glymes can be used.

Furthermore, as an additive of the nonaqueous electrolyte, an organic substance having unsaturated bond in molecules and being able to reduction polymerization is preferred. If the additive is added, an effective solid electrolyte interface film on the surface of the negative electrode material, and decomposition of the electrolyte and nonaqueous solvent can be suppressed. As the additive, for example, a carbonate such as fluoroethylene carbonate, vinylene carbonate (VC), and vinylethylene carbonate, and its derivative, or unsaturated carboxylate esters, phosphate esters, boric acid ester, and alcohols can be used.

<Outer Body RF>

The laminate films RF1 and RF2 of the outer body RF include, as described above, a protection layer, metal layer, and heat sealing resin layer. The protection layer, metal layer, heat sealing resin layer are formed of a single or multiple layers of the following materials. An adhesive layer may be formed between the layers.

The protection layer is not limited specifically, and is a known or commercially-available material, for example, nylon, or polyethylene terephthalate (PET).

The metal layer is not limited specifically, and is a known or commercially-available material, for example, a metal foil containing at least one metal selected from a group of iron, nickel, copper, tin, and aluminum. The metal layer is, preferably, an aluminum foil or a stainless foil.

The heat sealing resin layer is not limited specifically, and is a known or commercially-available material, for example, a polyolefin resins such as PP and PE.

(Manufacturing Method of Nonaqueous Electrolyte Secondary Battery)

Now, an example of a manufacturing method of the nonaqueous electrolyte secondary battery of the present embodiment will be explained.

A positive electrode slurry is prepared by mixing a positive electrode active material, conductive agent, binding agent, and solvent. Then, the positive electrode slurry is applied to both surfaces of a positive electrode collector body. Then, the solvent is dried, and the dried positive electrode slurry is compressed to form a positive electrode layer. Then, the layer is cut such that a band-like positive electrode collector lead 11 extends from one side of the positive electrode plate 1 as a rectangular positive electrode collector body in which the positive electrode layer is formed.

A negative electrode slurry is prepared by mixing a negative electrode active material, binding agent, and solvent. Then, the negative electrode slurry is applied to both surfaces of a negative electrode collector body. Then, the solvent is dried, and the dried negative electrode slurry is compressed to form a negative electrode layer. Then, the layer is cut such that a band-like negative electrode collector lead 12 extends from one side of the negative electrode plate 2 as a rectangular negative electrode collector body in which the negative electrode layer is formed.

Then, positive electrode plates 1, negative electrode plates 2, and separators are prepared. An electrode group 10 is prepared by laminating the positive electrode plates 1 and the negative electrode plates 2 alternately with separators interposed therebetween. Note that the negative electrode plates 2 are disposed at end surfaces of the electrode group 10 in the lamination direction (direction Z). At that time, they are laminated such that the positive electrode collector lead 11 and the negative electrode collector lead 12 extend in the direction Y from the first side surface F1 of the electrode group 10 (the upper side in FIG. 1).

Then, the collector leads 11 and 12 extending from the electrode group 10 are converged to be biased to the center along the lamination direction of the electrode group 10 (direction Z). Then, on the upper surfaces of the terminals 13 and 14, the ends of the converged collector leads 11 and 12 are overlaid to be connected to each other by ultrasound welding. Then, at each of the parts of the terminals 13 and 14 passing through the sealing member R1, a heat sealing resin part 6 covering the peripheral surface thereof is formed.

Then, as in FIGS. 4(a) and 4(b), two laminate films RF1 and RF2 having the same shape with a hollow rectangular container concave part with a bottom, and a flat part surrounding the container concave part are prepared. Then, two laminate films RF1 and RF2 are arranged such that the heat sealing resin layers thereof are opposed to each other. Then, the laminate films RF1 and RF2 are overlaid such that the electrode group 10 and a part of the collector leads 11 and 12 are accommodated in two container concave parts. At that time, a part of each of the terminals 13 and 14 where the heat sealing resin part 6 is formed passes through a gap between the peripheral edges of two laminate films RF1 and RF2, and the electrode group 10 is arranged such that a part of the terminals 13 and 14 is exposed. Here, in the part corresponding to the second container part R3 of each flat part, the remaining part of the collector leads 11 and 12 and a part of the terminals 13 and 14 connected to the collector leads 11 and 12 are accommodated. In such a state, the heat sealing resin layer of the peripheral edges of the laminate films RF1 and RF2 is heat sealed as with the sealing member R1 of FIG. 4(a) in three sides including the side where the terminals 13 and 14 of the laminate films RF1 and RF2 extend. At that time, the gap between each heat sealing resin layer and the heat sealing resin part 6 is heat sealed.

Then, a nonaqueous electrolyte fluid is charged in from one side of the outer body RF where is not heat sealed. Then, under the decompressed environment, the remaining one side of the outer body RF is heat sealed, and the nonaqueous electrolyte secondary battery as in FIGS. 4(a) and 4(b) is manufactured.

Note that, before using a lithium ion secondary battery as an example of the nonaqueous electrolyte secondary battery, a gas discharge process is, preferably, performed by performing preliminary charge/discharge to discharge a gas. Through a gas discharge process, an expansion of the outer body RF by a gas in the use of the battery can be prevented.

Note that, a solvent used for a positive electrode slurry and a negative electrode slurry is not limited specifically, and is a known or commercially-available solvent, for example, N-methyl-2-pyrrolidone (NMP). If PVdF is used as a binding agent, NMP should be used as a solvent. If SBR, PTFE, polyvinyl alcohol, CMC or the like is used as a binding agent, water should be used as a solvent.

(Example)

Now, the present invention will be explained further based on an example.

A test battery of an example was manufactured through the following method. Note that the manufacturing method of the test battery which is not specified in the following description is the same as the above-described manufacturing method of the nonaqueous electrolyte secondary battery of the embodiment.

[Preparation of Test Battery of Example]
[Preparation of Positive Electrode Plate]

90 pts.wt. of lithium iron phosphate as a positive electrode active material, 5 pts.wt. of PVdF as a binding agent, and 5 pts.wt. of carbon black as a conductive agent were dispersed in NMP as a solvent to prepare a positive electrode slurry. Then, the positive electrode slurry was applied to both surfaces of aluminum foil as a positive electrode collector (heat conductivity $\lambda_1$: 237 W/m·K, thickness $t_{11}$: 20 μm). Then, the solvent is dried, and the dried positive electrode slurry was compressed to form a positive electrode layer. Then, the layer was cut such that a band-like positive electrode collector lead extends from one side of the positive electrode plate as a rectangular positive electrode collector with the positive electrode layer. As a separator, a PE single layer film prepared by a wet biaxial stretching method with a thickness of 25 μm.

[Preparation of Negative Electrode Plate]

98 pts.wt. of graphite as a negative electrode active material, 1 pt.wt. of SBR as a binding agent, and 1 pt.wt. of CMC as a thickener were dispersed in deionized water as a solvent to prepare a negative electrode slurry. Then, the negative electrode slurry was applied to both surfaces of copper foil as a negative electrode collector (heat conductivity $\lambda_2$: 401 W/m·K, thickness $t_{12}$: 10 μm). Then, the solvent is dried, and the dried negative electrode slurry was compressed to form a negative electrode layer. Then, the layer was cut such that a band-like negative electrode collector lead extends from one side of the negative electrode plate as a rectangular negative electrode collector with the negative electrode layer.

[Preparation of Electrode Group]

Then, an electrode group was prepared by laminating 29 positive electrode plates and 30 negative electrode plates alternately with separators are interposed therebetween. Note that negative electrode plates are arranged at end surfaces of the electrode group in the lamination direction (direction Z). At that time, the plates are laminated such that each collector lead extends from the first side surface F1 of the electrode group (upper side of FIG. 1) to the direction Y. The manufactured electrode group is a cuboid having a width in the direction X (width of the first side surface F1) (W1 of FIG. 1) of 164 mm, and a length in the direction Y (L1 of FIG. 1) of 115 mm. Thus, the first side surface F1 is a side surface of the electrode group in the longitudinal direction.

Then, the collector leads are converged along the lamination direction of the electrode group (direction Z) to be biased to the center, and are connected to one surface of an end of each terminal by ultrasonic welding. The positive electrode plate is an aluminum plate having a width in the direction X (W3 of FIG. 1) of 60 mm and a thickness of 0.3 mm. The negative electrode terminal is a copper plate having a width in the direction X (W4 of FIG. 1) of 60 mm and a thickness of 0.3 mm. Then, at the part of the positive electrode terminal and the negative electrode terminal passing through the sealing member, a heat sealing resin part formed of polyolefin is formed to cover the peripheral surface thereof.

The widths of the collector leads in the direction X (W5 and W6 of FIG. 3) are 62 and 63 mm, respectively. Thus, if the width of the first side surface of the electrode group (W1 of FIG. 1) is W1, and a sum of widths of the collector leads (W5+W6) is W2, a ratio of W2/W1 is approximately 0.76.

The positive electrode collector lead has a length from one end connected to the positive electrode plate to the other end connected to the positive terminal (L2 of FIG. 3) is 12 mm. The negative electrode collector lead has a length from one end connected to the negative electrode plate to the other end connected to the negative terminal (L3 of FIG. 3) is 8 mm. Thus, a ratio of r2/r1 is, based on the values of heat resistances r1 and r2 calculated from the above-mentioned formulae (1) and (2), 0.78.

[Preparation of Outer Body]

Two laminate films having a rectangular outer shape with a container concave part to accommodate the electrode group and a flat part surrounding the container concave part were prepared as in FIGS. 4(a) and 4(b). The laminate film includes a heat sealing resin layer formed of polyolefin, metal layer formed of aluminum foil, and protection layer formed of nylon resin and polyester resin, layered in this order. Two laminate films have a thickness of 153 μm.

[Assembly of Test Battery]

Two laminate films were arranged such that the heat sealing resin layers thereof are opposed to each other. Then, the laminate films were overlaid such that the electrode group is accommodated in two container concave parts. Between the peripheral edges of two laminate films, the electrode group was arranged such that a part of each of the terminals where the heat sealing resin part is formed passes through, and a part of the terminals is exposed. In that state, the heat sealing resin layers of the peripheral edges of the laminate films are heat sealed in three sides including a side where each terminal of the laminate films extends, and a rectangular frame-like sealing member with a width of 10 mm was prepared.

Then, from one side of the outer body which has not been heat sealed, a nonaqueous electrolyte fluid was charged. The nonaqueous electrolyte fluid was prepared based on a mixed solvent with a volume ratio of EC:EMC:DMC of 2:5:3, and $LiPF_6$ as electrolytes dissolved therein with a ratio of 1.3 mol/L. As an additive, 3 pts.wt. VC was added to the nonaqueous electrolyte fluid. Then, under the decompressed environment, the remaining one side of the outer body was heat sealed, and the nonaqueous electrolyte secondary battery of FIGS. 4(a) and 4(b) was manufactured.

The outer body was rectangular in a plan view, and the width of the outer body in the direction X (W7 of FIG. 4(a)) was 194 mm, and the length in the direction Y (L6 of FIG. 4(a)) was 162.5 mm. The first container part was formed as a cuboid along the shape of the electrode group, and width W8 in the direction X was 170 mm, and a length in the direction Y (La of FIG. 1) was 120 mm, and a thickness ($t_{R2}$ of FIG. 4(b)) was 9.5 mm. The width of the terminal exposed to the outside in the direction X (W3 and W4 of FIG. 4) was 60 mm, and a length in the direction Y (L4 and L5 of FIG. 4(a)) was 23.5 mm.

The total surface area S1 of the first container part calculated from the above dimensions was 463.1 $cm^2$. Furthermore, the total surface area of the first container part in the thickness direction was 55.1 $cm^2$. In the calculation of the total surface area S2, since the thickness of each components in the heat releasing part was 2 mm or less, the surface area in the thickness direction was ignored. In the test battery, a ratio of S2/S1 was 0.6. Furthermore, in the test battery, a ratio of S2/S3 was 5.06. The second container part had a length in the direction Y (Lb of FIG. 1) of 20.5 mm. Thus, the value of Lb/(La+Lb) of the test battery was 0.15.

<Evaluation: Temperature Distribution of First Container Part in Discharge State>

Figure 7:
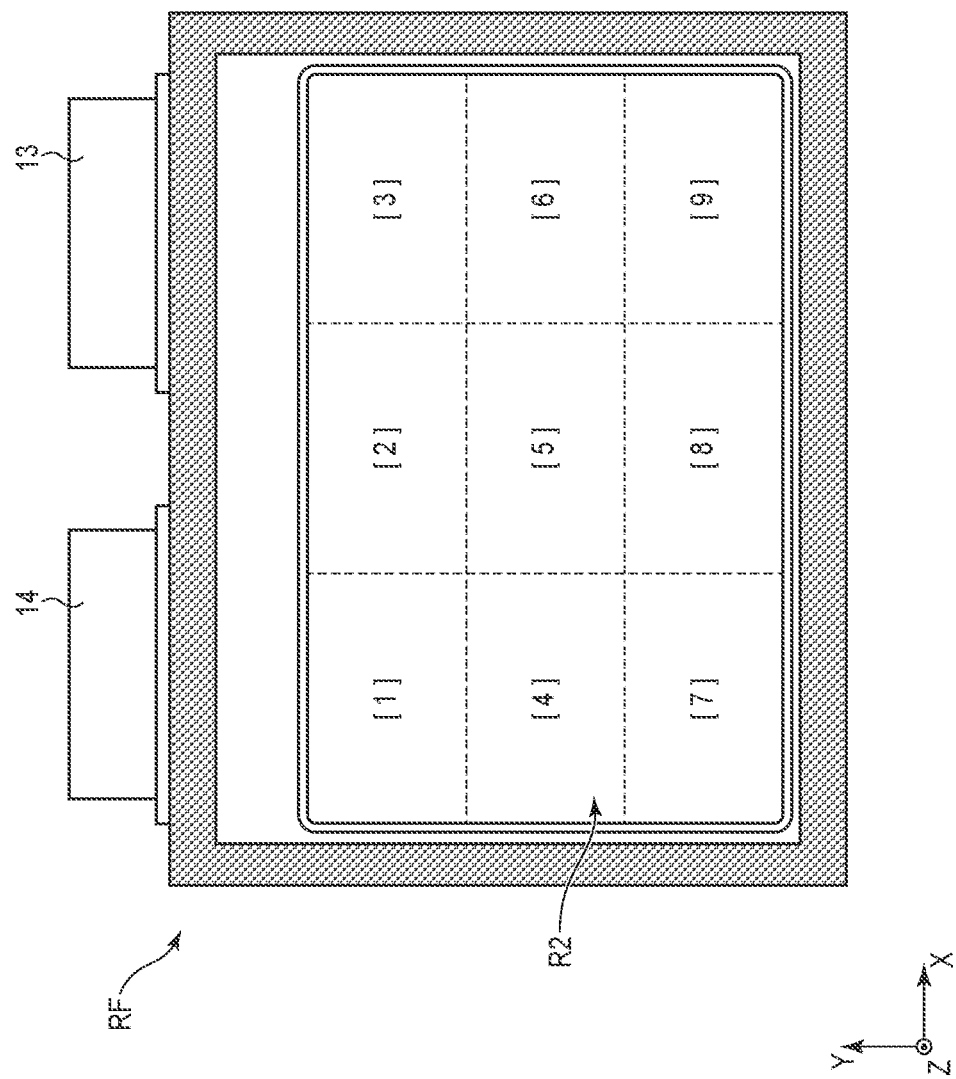
FIG. 7 is a plan view illustrating a first container divided into nine equal areas in a plan view.

Temperature distribution of the first container part in a high rate discharge state was measured with respect to the test battery of the example. FIG. 7 is a plan view of the first container part of the nonaqueous electrolyte secondary battery which was divided to three parts in the directions X and Y to be nine equal areas in a plan view.

In order to measure the temperature distribution of the first container part, a thermocouple was connected to the center of each of nine areas. Then, the test battery to which the thermocouple was connected was interposed between two silicon rubbers and wrapped by a glass wool insulation to be insulated. Then, after checking that nine thermocouples showed an average temperature of 25° C., each of test batteries were charged/discharged in the following charge/discharge conditions. A temperature at the time when 5.0 C discharge was performed until 2.0 V in the following conditions was measured in each of the nine thermocouples. Then, an average value of the temperatures of nine thermocouples was calculated in each test battery.

<Charge/Discharge Conditions>

0.5 C discharge until 2.0 V

Halt for Fifteen Minutes 0.5 C charge until 3.6 V (performed until charge current decreases to 0.05 C)

5.0 C discharge until 2.0 V

The temperature distribution of the first container part of the test battery was determined to be even if the maximum temperature difference ΔTmax with respect to the average temperature of nine points was within 2.0° C. Table 1 shows a temperature difference ΔT of measurement points of divisions [1] to [9] of FIG. 7 with respect to an average temperature. Here, as in FIG. 7, in the test battery, divisions [1], [4], and [7] are in the side where the negative electrode collector lead is connected, and divisions [3], [6], and [9] are in the side where the positive electrode collector lead is connected. The divisions [1], [2], and [3] are in the same position in the direction Y. Divisions [4], [5], and [6] are in the same position in the direction Y. Divisions [7], [8], and [9] are in the same positioned in the direction Y. By comparing the divisions [1], [4], and [7] with the divisions [3], [6], and [9], a difference of the heat releasing performances of the side where the positive electrode collector lead is connected and the side where the negative electrode collector lead is connected can be checked.

TABLE 1

| Division | Temperature difference ΔT[° C.] | Division | Temperature difference ΔT[° C.] | Division | Temperature difference ΔT[° C.] |
| --- | --- | --- | --- | --- | --- |
| [1] | −1.5 | [2] | −1 | [3] | −1 |
| [4] | 0.7 | [5] | 1.3 | [6] | 0.7 |
| [7] | 0 | [8] | 0.7 | [9] | 0.1 |

As in Table 1, the test battery of the example indicated that the maximum temperature difference ΔTmax with respect to the average temperature of nine points was approximately 1.5° C., and the temperature distribution of the first container part in the discharge state was even. Furthermore, as in the above-mentioned prior-art technique literature, it is generally known that a temperature becomes high in the divisions [1], [2], and [3] closer to the first side surface to which each collector lead is connected. In the test battery of the example, the temperature of the divisions [1], [2], and [3] facing the second container part is lower than the average temperature, and thus, it is obvious that the heat of the electrode group has been released from the second container part.

Furthermore, when temperature differences ΔT between divisions [1] and [3], between [4] and [6], and between [7] and [9] were compared, there was almost no difference therebetween. The result shows that, with r2/r1 defined as 0.7 or more and 1.4 or less, the heat generated in the electrode group was released to the same degree through the collector leads, and the temperature distribution became the same in the side where the positive electrode collector lead was connected and in the side where the negative electrode collector lead was connected.

From the results obtained from the example, it is determined that the nonaqueous electrolyte secondary battery of the embodiment exerted high heat radiation and evened temperature distribution of the electrode group in the charge/discharge state.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery comprising:
    a rectangular electrode group including a plurality of pairs of a positive electrode plate and a negative electrode plate arranged to be opposed to each other with a separator interposed therebetween, the group having one side surface;
    a nonaqueous electrolyte maintained in the electrode group;
    band-shaped positive electrode collector leads electrically connected to the positive electrode plates, respectively, in the side surface;
    band-shaped negative electrode collector leads electrically connected to the negative electrode plates, respectively, in the side surface;
    a flat plate-shaped positive terminal electrically connected to ends of the positive electrode collector leads;
    a flat plate-shaped negative terminal electrically connected to ends of the negative electrode collector leads; and
    an outer body formed of one or two laminate films including aluminum foil as a middle layer, the outer body including a sealing member formed by sealing periphery edges of the laminate films, and a container member surrounded by the sealing member to contain the electrode group, wherein:
    the positive electrode collector leads are converged and connected to each other, the positive terminal being electrically connected to the ends of the converged positive electrode collector leads,
    the negative electrode collector leads are converged and connected to each other, the negative terminal being electrically connected to the ends of the converged negative electrode collector leads,
    the container member includes a first container member and a second container member divided by a direction parallel to the direction along the side surface,
    the positive electrode collector leads and the negative electrode collector leads extend from the side surface of the electrode group to the inside of the second container member through the first container member,
    the electrode group, parts of the positive electrode collector leads from the side surface of the electrode group to the converged positive electrode collector leads, and parts of the negative electrode collector leads from the side surface of the electrode group to the converged negative electrode collector leads are accommodated in the first container member,
    flat parts excluding the parts of the positive electrode collector leads, flat parts excluding the parts of the negative electrode collector leads, and a part of the positive terminal and a part of the negative terminal connected to the collector leads, respectively are accommodated in the second container member,
    the positive terminal and the negative terminal extend from the second container member to the outside through the sealing member,
    a length La of the first container member and a length Lb of the second container member in a direction orthogonal to the side surface satisfy a relationship of $0.1 \leq Lb/(La+Lb) \leq 0.2$, and
    a ratio of r2/r1, where a thermal resistance of portions of the positive electrode collector leads from ends connected to the positive electrode plates and the other ends connected to the positive terminal is r1, and a thermal resistance of portions of the negative electrode collector leads from ends connected to the negative electrode plates to the other ends connected to the negative terminal is r2, is 0.7 or more and 1.4 or less.

2. The nonaqueous electrolyte secondary battery of claim 1, wherein the side surface is a side surface of the electrode group in the longitudinal direction.

3. The nonaqueous electrolyte secondary battery of claim 1, wherein a ratio of W2/W1, where a width of the side surface of the electrode group is W1 and a sum of widths of the positive electrode collector leads and the negative electrode collector leads is W2, is 0.6 or more and 0.9 or less.

4. The nonaqueous electrolyte secondary battery of claim 1, wherein a part of the outer body excluding the first container member and parts of the positive terminal and the negative terminal exposed to the outside function as a radiator, and a ratio of S2/S1, where a total surface area of the first container member is S1 and a total surface area of the radiator is S2, is 0.4 or more and 1.0 or less.

5. The nonaqueous electrolyte secondary battery of claim 4, wherein a ratio of S2/S3, where a total surface area of the first container member in the thickness direction is S3 and a total surface area of the radiator is S2, is 4.5 or more.

6. The nonaqueous electrolyte secondary battery of claim 1, wherein a positive electrode active material used in the positive electrode plates and a negative electrode active material used in the negative electrode plates are formed of a material which can charge/discharge lithium ion.

* * * * *